United States Patent
Kurachi

(10) Patent No.: US 12,434,098 B2
(45) Date of Patent: Oct. 7, 2025

(54) METHOD, APPARATUS, AND PROGRAM FOR CONTROLLING DISPLAY

(71) Applicant: AMPLUS Co., Ltd., Yokohama (JP)

(72) Inventor: Nobuhisa Kurachi, Yokohama (JP)

(73) Assignee: AMPLUS CO., LTD., Yokohama (JP)

( * ) Notice: Subject to any disclaimer, the term of this patent is extended or adjusted under 35 U.S.C. 154(b) by 65 days.

(21) Appl. No.: 18/136,074

(22) Filed: Apr. 18, 2023

(65) Prior Publication Data

US 2024/0115904 A1 Apr. 11, 2024

Related U.S. Application Data

(63) Continuation of application No. PCT/JP2022/047052, filed on Dec. 21, 2022.

(30) Foreign Application Priority Data

May 9, 2022 (JP) .................................. 2022-77045

(51) Int. Cl.
*A63B 24/00* (2006.01)
*G06T 7/00* (2017.01)
(Continued)

(52) U.S. Cl.
CPC ............ *A63B 24/0003* (2013.01); *G06T 7/11* (2017.01); *G06T 7/74* (2017.01); *G06T 7/97* (2017.01);
(Continued)

(58) Field of Classification Search
CPC ......... A63B 24/0003; G06T 7/74; G06T 7/11; G06T 7/97; G06T 2207/20081; G06T 2207/30221
See application file for complete search history.

(56) References Cited

U.S. PATENT DOCUMENTS

2007/0298896 A1* 12/2007 Nusbaum ........... A63B 69/3661
 473/131
2019/0192950 A1* 6/2019 Tuxen ..................... A63B 71/06
(Continued)

FOREIGN PATENT DOCUMENTS

JP 2018-061729 A 4/2018
JP 2020-524580 A 8/2020
(Continued)

OTHER PUBLICATIONS

Korean Office Action issued Sep. 26, 2023 in Korean Application No. 20237027857A and English Translation thereof.
(Continued)

*Primary Examiner* — Xuan M Thai
*Assistant Examiner* — Ankit B Doshi
(74) *Attorney, Agent, or Firm* — MCGINN I.P. LAW GROUP, PLLC

(57) ABSTRACT

A display control apparatus includes: a captured image obtaining unit that obtains captured images of a clubhead of a golf club; a specified position detecting unit that detects positional data of a toe and a heel of the clubhead which are included in the captured images, by inputting the captured images obtained by the captured image obtaining unit into a learned model obtained by machine learning of relationships between multiple captured images of club heads of golf clubs and positional data of toes and heels of the clubheads which are included in the multiple captured images; and a control unit that displays information based on the positional data of the toe and the heel of the clubhead detected by the specified position detecting unit.

16 Claims, 5 Drawing Sheets

(51) Int. Cl.
 *G06T 7/11* (2017.01)
 *G06T 7/73* (2017.01)
(52) U.S. Cl.
 CPC ............... *G06T 2207/20081* (2013.01); *G06T 2207/30221* (2013.01)

(56) References Cited

U.S. PATENT DOCUMENTS

| | | | | |
|---|---|---|---|---|
| 2022/0092844 A1* | 3/2022 | Daniels | ................. | G06V 40/20 |
| 2022/0161121 A1* | 5/2022 | Syed | ................. | A63B 71/0669 |
| 2023/0072561 A1* | 3/2023 | Yoon | ................. | A63B 69/3608 |

FOREIGN PATENT DOCUMENTS

| | | |
|---|---|---|
| JP | 6904624 B | 7/2021 |
| KR | 10-2018-0028449 A | 3/2018 |
| KR | 10-2021-0149240 A | 12/2021 |

OTHER PUBLICATIONS

Japanese Office Action in Japanese Application No. 2022-077045, with an English Translation thereof.

* cited by examiner

METHOD, APPARATUS, AND PROGRAM FOR CONTROLLING DISPLAY

CROSS-REFERENCE TO RELATED APPLICATIONS

The present application is a continuation of PCT Application No. PCT/JP2022/47052, which was filed on Dec. 21, 2022, which claims priority under 35 U.S.C. § 119 to Japanese Patent Application No. 2022-77045, filed on May 9, 2022. The above application is hereby expressly incorporated by reference, in its entirety, into the present application.

BACKGROUND OF THE INVENTION

1. Field of the Invention

The present disclosure is related to a display control apparatus, a display control method, and a display control program that display information related to a golf club swing, based on captured images of a golf clubhead which are captured during the golf club swing.

2. Description of the Related Art

Conventionally, there are various apparatuses that capture images of a golfer during a swing to date. By providing the golfer with the recorded image information of the swing, it becomes possible to promote the improvement of golf swing and enables the proper fitting of a golf club which is suited to the golfer.

As an example of such an apparatus, Japanese Unexamined Patent Publication No. 2018-61729 proposes an apparatus that captures images of a golf club and a golf ball during a golf club swing from above, and projects and displays the captured images of the clubhead and the golf ball on a floor surface in actual size.

SUMMARY OF THE INVENTION

Here, the sequential movement of the surface of a clubface and the clubhead path during a swing are important factors in a golfer's swing. By articulating the movement of the clubface and the clubhead path during a swing, it not only enables the instant understanding of the characteristics of the golfer's swing, but also the selection of a golf club which is matched to such characteristics.

However, it is difficult to detect the position of the clubhead and the clubface with high precision from captured images only by capturing a moving clubhead from above as proposed in Japanese Unexamined Patent Publication No. 2018-61729.

In addition, Japanese Patent No. 6904624 proposes a method in which a fiducial marking/markings for measuring movement of a clubhead is adhered to the clubhead, as well as the clubface of the clubhead, etc. is used for detection of the marking, thus, detecting of clubhead and the club face movement with high precision.

However, the method described in Japanese Patent No. 6904624 adhesive attachment of the fiducial mark(s) for measuring movement of a clubhead. Therefore, in the case that the movement of clubfaces is detected for a variety of golf clubs, it is necessary for marks for measuring movement of clubheads to be adhesively attached to each of the golf clubs, which is troublesome.

The present disclosure has been developed in view of the foregoing circumstances. The present disclosure provides a method, an apparatus, and a program that facilitate confirmation of information related to a golf club swing.

The display control apparatus of the present disclosure is equipped with: a captured image obtaining unit that obtains captured images of a clubhead of a golf club; a specified position detecting unit that detects positional data of a toe and a heel of the clubhead which are included in the captured images, by inputting the captured images obtained by the captured image obtaining unit into a learned model obtained by machine learning of relationships between a plurality of (or multiple) captured images of clubheads of golf clubs and positional data of toes and heels of the clubheads which are included in the plurality of captured images; and a control unit that displays information based on the positional data of the toe and the heel of the clubhead detected by the specified position detecting unit.

The display control method of the present disclosure obtains captured images of a clubhead of a golf club; detects positional data of a toe and a heel of the clubhead which are included in the captured images, by inputting the captured images into a learned model obtained by machine learning of relationships between multiple captured images of clubheads of golf clubs and positional data of toes and heels of the clubheads which are included in the multiple captured images; and displays information based on the positional data of the toe and the heel of the clubhead.

The display control program of the present disclosure causes a computer to execute a step obtaining captured images of a clubhead of a golf club; a step detecting positional data of a toe and a heel of the clubhead which are included in the captured images, by inputting the captured images into a learned model obtained by machine learning of relationships between multiple captured images of clubheads of golf clubs and positional data of toes and heels of the clubheads which are included in the multiple captured images; and a step displaying information based on the positional data of the toe and the heel of the clubhead.

According to the display control apparatus, the display control method, and the display control program of the present disclosure, positional data of the toe and the heel of the clubhead which are included in the captured images are detected, by inputting the captured images into a learned model, and information is displayed based on the detected positional data of the toe and the heel of the clubhead. Therefore, confirmation of information related to a golf club swing is facilitated.

DETAILED DESCRIPTION OF THE INVENTION

Figure 1:
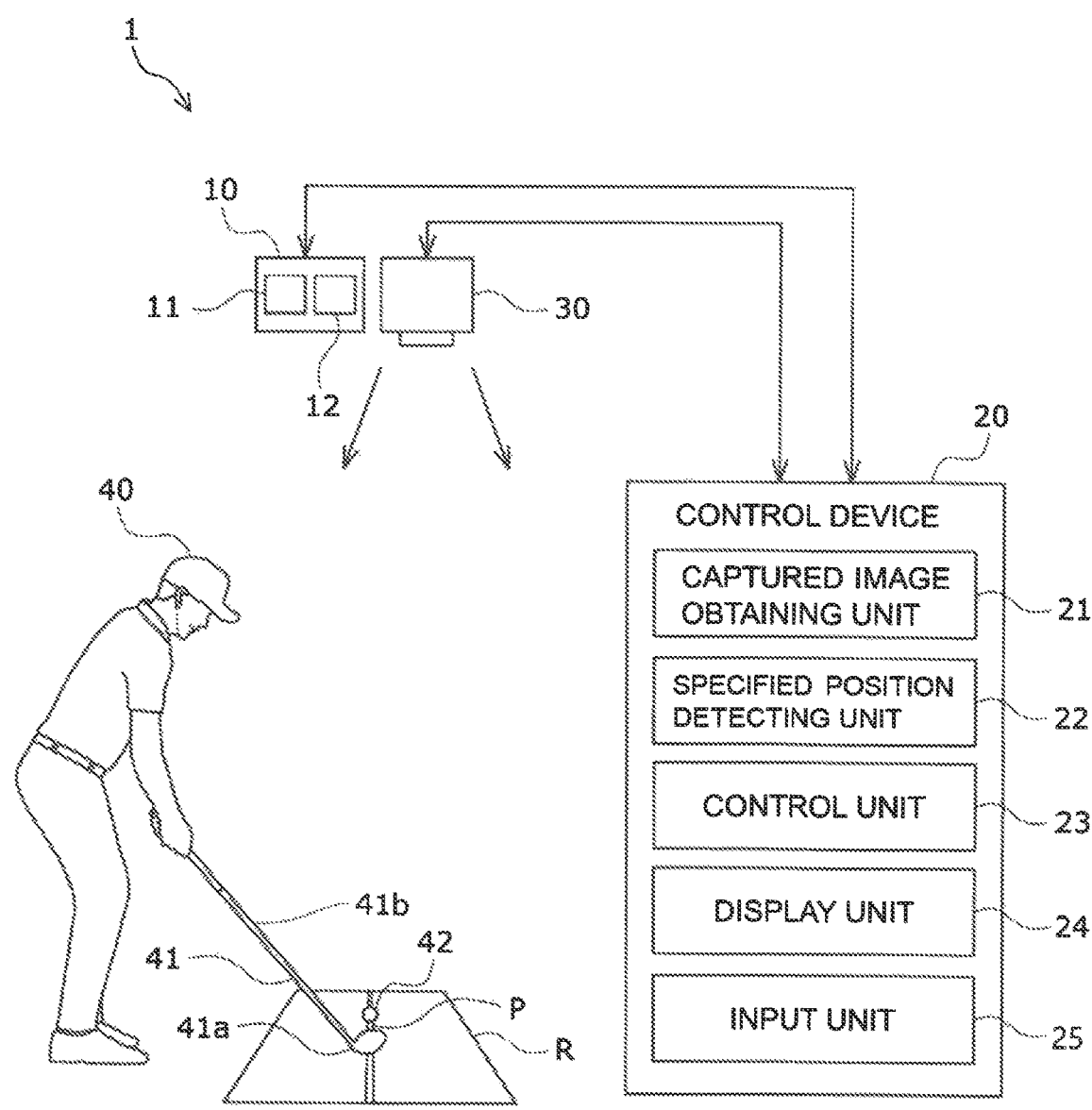
FIG. 1 is a diagram that illustrates the schematic configuration of a golf impact analyzing system that employs an embodiment of the display control apparatus of the present disclosure.

Hereinafter, a golf impact analyzing system that employs an embodiment of the display control apparatus of the present disclosure will be described in detail with reference to the attached drawings. The golf impact analyzing system of the present embodiment is characterized in a method of detecting a specific position of a clubhead based on captured images and displaying information based on the specific position. First, an overview of the golf impact analysis system will be described. FIG. 1 is a diagram that illustrates the schematic configuration of the golf impact analysis system 1 of the present embodiment.

As illustrated in FIG. 1, the golf impact analysis system 1 of the present embodiment is equipped with an image capturing device 10, a control device 20, and a projection device 30. The image capturing device 10 and the control device 20 as well as the control device 20 and the projection device 30 are communicably connected by wire or wirelessly, and are configured such that exchange of various types of signals is made possible.

The image capturing device 10 captures images of clubhead 41a of a golf club 41 from above, when a golfer 40 swings the golf club 41. The image capturing device 10 is provided above the golfer 40 who swings the golf club 41, and immediately above a range at which the clubhead 41a passes through the vicinity of a floor surface, such that images in the image capture range can be captured. Specifically, the image capturing device 10 is provided immediately above the image capture range R set in advance, having a position P at which a golf ball 42 is placed in the vicinity of the center thereof. The image capturing device 10 may be placed on a support structure such as a stand, or may be mounted on a ceiling.

The image capturing device 10 is equipped with an illuminating unit 11 and a camera unit 12. The illuminating unit 11 of the present embodiment has an infrared light source, and irradiates infrared light output from the infrared light source onto the image capture range R. The camera unit 12 has an image capturing element such as a CMOS (Complementary Metal Oxide Semiconductor) image sensor and a CCD (Charge Coupled Device) image sensor, and an IR filter disposed at the front surface of the image capturing element. The IR filter is an optical filter that absorbs visible light and transmits infrared light.

The image capturing device 10 emits infrared light from the illuminating unit 11 based on a control signal output from a control unit 23 of the control device 20 to be described later, and captures images in the image capture range R with the camera unit 12. Specifically, the image capturing device 10 emits infrared light from the illuminating unit 11 and captures images of the clubhead 41a that passes through the image capture range R at a predetermined frame rate. Captured images which are captured by the image capturing device 10 at the predetermined frame rate are output to the control device 20.

The control device 20 is constituted by a computer or the like, and is equipped with hardware that includes a CPU (Central Processing Unit), a semiconductor memory such as a ROM (Read Only Memory) and a RAM (Random Access Memory), a storage device such as a hard disk, and a communications interface. In the present embodiment, the control device 20 corresponds to the display control apparatus of the present disclosure.

The control device 20 is equipped with a captured image obtaining unit 21, a specified position detecting unit 22, a control unit 23, a display unit 24, and an input unit 25.

A golf impact analyzing program is installed in the semiconductor memory or the hard disk of the control device 20. The captured image obtaining unit 21, the specified position detecting unit 22, and the control unit 23 are made to function by this program being executed by the CPU. Note that in the present embodiment, the functions of each of the aforementioned unit are executed by the golf impact analyzing program, however, the present disclosure is not limited to such a configuration, and a portion or the entirety of the aforementioned functions may be executed by hardware components such as an ASIC (Application Specific Integrated Circuit), an FPGA (Field Programmable Gate Array), or other electric circuits.

Hereinafter, each component of the control device 20 will be described in detail.

The captured image obtaining unit 21 obtains multiple images, which are captured in temporal series by the image capturing device 10 during a swing of the golf club 41.

The specified position detecting unit 22 detects positional data of a toe and a heel of the clubhead 41a as well as a neck and a shaft 41b of the golf club 41 which are included in each of the obtained captured images by the captured image obtaining unit.

Figure 2:
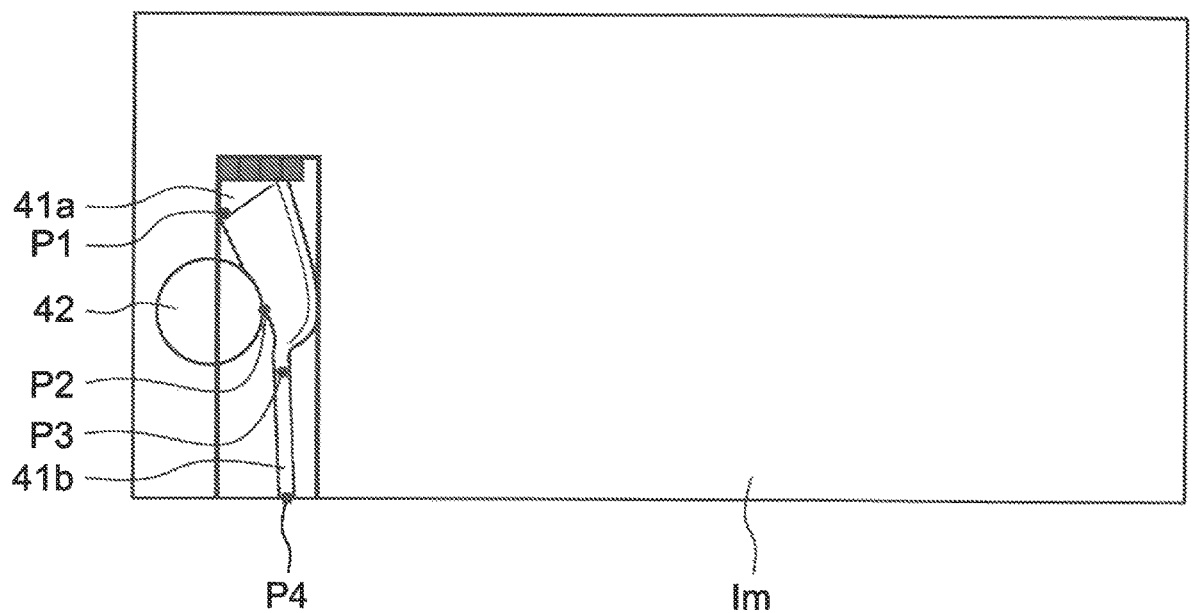
FIG. 2 is a diagram that illustrates an example of a captured image in which positional data of a toe and a heel of a clubhead, as well as a neck and an edge at the position of the shaft of a golf club are detected.

FIG. 2 is a diagram that illustrates an example of a captured image in which positional data of the toe and the heel of the clubhead 41a, as well as the neck and an edge of the captured image at the position of the shaft 41b of the golf club 41b are detected by the specified position detecting unit 22. Point P1 denotes the position of the toe, point P2 denotes the position of the heel, point P3 denotes the position of the neck, and point P4 denotes the edge of the captured image at the position of the shaft 41b.

The edge of the captured image at the position of the shaft 41b is an edge opposite the side of the clubhead 41a in an image that represents the shaft which is included in the captured image as illustrated in FIG. 2. That is, the edge of the captured image at the position of the shaft 41b is an edge where a point at which the image that represents and the edge (side) of the captured image and the image of the shaft 41b intersect. Hereinafter, the edge of the captured image at the position of the shaft 41b will be referred to as an "edge".

The specified position detecting unit 22 has a learned model obtained by machine learning of relationships between multiple captured images of clubheads 41a of golf clubs 41 and positional data of toes and heels of the clubheads 41a, as well as necks of the golf clubs 41 and the edge of the captured images at the position of shafts 41b which are included in the multiple captured images.

The specified position detecting unit 22 inputs the captured image obtained by the captured image obtaining unit 21 into the learned model, to detect positional data of the toe, heel, neck, and edge which are included in the input captured image. The learned model is generated by a Convolutional Neural Network, for example. However, the present disclosure is not limited to such a configuration, and machine learning may be conducted employing other known machine learning models.

The learned model is generated by machine learning captured images in which the positions of toes, heels, necks, and edges are annotated. Machine learning is conducted based on the sematic segmentation machine learning technique or the key point machine learning technique that takes a heat map into consideration.

In addition, it is preferable for the learned model to be that which is obtained by machine learning relationships between multiple captured images having different levels of luminosity and positional data of toes, heels, necks and edges which are included in multiple captured images. That is, it is preferable for captured images having different levels of luminosity as the multiple captured images to be employed in machine learning to obtain the learned model. Thereby, positional data of toes, heels, necks, and edges can be detected with equivalent accuracy even in the case that illumination conditions differ among captured images which are input into the learned model and the levels of luminosity differ. Note that it is more preferable for a gray scale averaging (flattening) process to be administered onto captured images by the specified position detecting unit 22 when captured images are input as targets of detection.

Further, in the present embodiment, the learned model is provided in the specified position detecting unit 22. However, the present disclosure is not limited to such a configuration, and a learned model which is recorded in an external server device in advance, separate from the control device 20, may be utilized.

The control unit 23 controls the entirety of the golf impact analyzing system 1. Specifically, the control unit 23 communicates with the image capturing device 10 via the communication interface, and outputs control signals that command image capture initiating timings and image capture frame rates to the image capturing device 10. In addition, the control unit 23 communicates with the projection device 30 via the communication interface, and causes the projection device to display various types of information on the floor surface.

Particularly, the control unit 23 of the present embodiment causes the projection device 30 to display various types of information on the floor surface based on the positional data of the toe and the heel of the clubhead 41a, the neck of the golf club 41, and the edge where the shaft 41b is positioned, which are detected by the specified position detecting unit 22.

Specifically, the control unit 23 displays the positions of the toe, the heel, the neck, and the edge on a captured image as points, as illustrated in FIG. 2. In addition, the control unit 23 causes the display unit 24 to sequentially display captured images which are captured in temporal series during a swing of the golf club 41, and displays the positions of the toe, the heel, the neck, and the edge on the captured images as points. Thereby, the movement of the positions of the toe, the heel, the neck, and the edge during the swing of the golf club 41 can be articulated, enabling confirmation of whether the swing is good or bad, as well as the suitability of the golf club 41.

In addition, the control unit 23 is capable not only of causing the projection device 30 to display the positions of the toe, the heel, the neck, and the edge as points, but also various other types of information related to the swing of the golf club 41 on the floor surface.

Specifically, the control unit 23 is capable of generating and displaying a line segment that represents the clubface of the clubhead 41a, by connecting the position of the toe and the position of the heel in a captured image with a straight line. Note that the term clubface is utilized throughout the present specification. The clubface is the surface of the clubhead 41a that impacts a golf ball. In the present embodiment, the line segment that represents the clubface is a boundary line between a crown portion and the clubface in the case of a driver, and the line segment that represents the clubface is a leading edge portion at the lowermost portion of the clubface in the case of an iron.

In addition, the control unit 23 is capable of generating a line segment that represents the clubface of the clubhead in each of the multiple captured images which are captured in temporal series during a swing of the golf club 41, and displaying a group of the line segments that represent the clubface.

Further, the control unit 23 is capable of calculating the center positions of the line segments that represent the clubface in each of the aforementioned multiple captured images, and generating and displaying a clubhead 41a path image, by connecting the multiple center positions and performing curve approximation.

Figure 3:
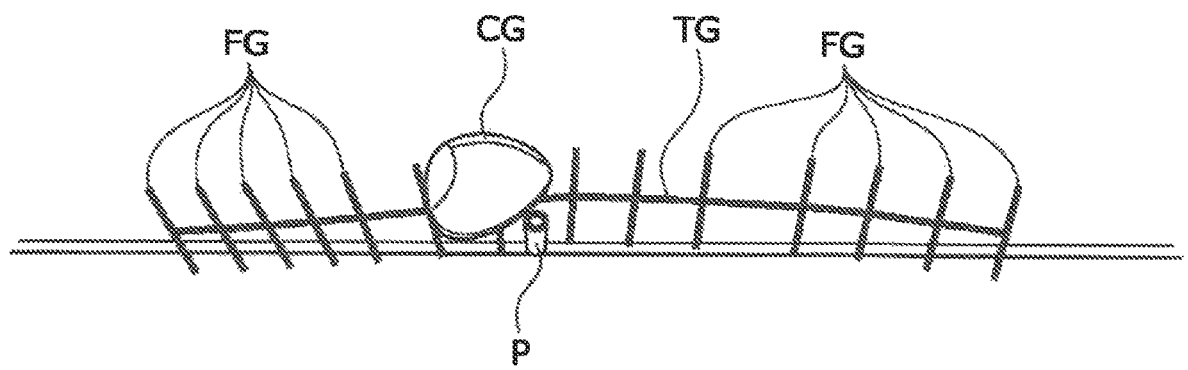
FIG. 3 is a diagram that illustrates an example of a projected display of a group of line segments that represent a clubface and a club path image, which are generated by a single golf club swing.

FIG. 3 is a diagram that illustrates an example of a projected display of a group of line segments FG that represent the clubface and a clubhead 41a path image TG, which are generated by a single swing of the golf club 41. The projection device 30 projects and displays the group of line segments FG that represent the clubface and the club path image TG onto the floor surface as illustrated in FIG. 3, for example. Note that the element CG illustrated in FIG. 3 is a three dimensional object image that represents the clubhead.

The three dimensional object image CG is a simulated image that represents the clubhead as a three dimensional image, different from the captured images which are captured by the image capturing device 10. The three dimensional object image CG that represents the clubhead is also generated by the control unit 23. The control unit 23 outputs the three dimensional object image CG to the projection device 30, and the projection device projects and displays the three dimensional object image CG on the floor surface.

FIG. 3 illustrates the three dimensional object image CG at a predetermined position along the club path image TG. However, the projection device 30 may move the three dimensional object image CG along the line of the club path image TG under control of the control unit 23, to perform animated display.

Figure 4:
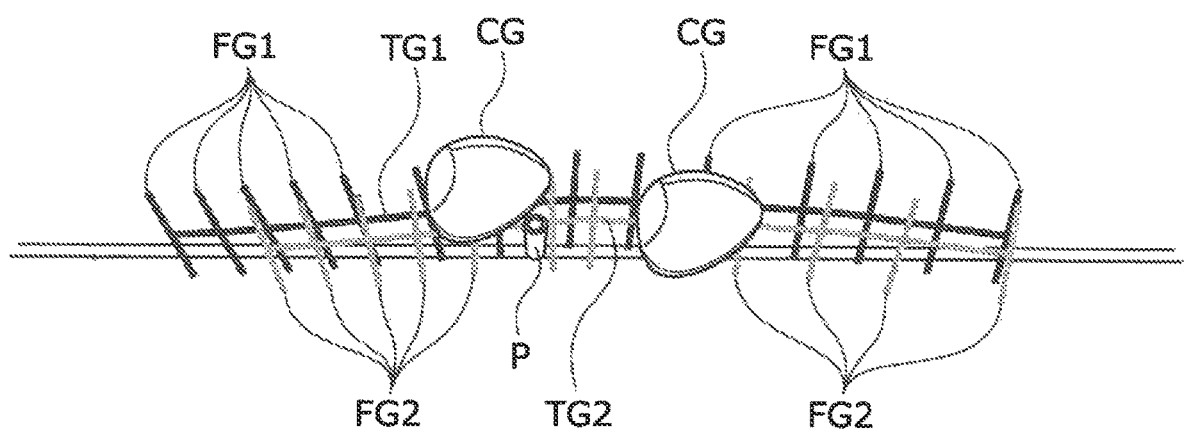
FIG. 4 is a diagram that illustrates an example of a projected display of a group of line segments that represent a clubface and a club path image, which are generated by two golf club swings.

In addition, FIG. 3 illustrates an example of a projected display of a group of line segments FG that represent the clubface and a club path image TG, which are generated by a single swing of the golf club 41. However, groups of line segments and club path images generated by two or more swings may be overlapped, projected, and displayed. FIG. 4 is an example of projected display of a combination of a group of line segments FG1 that represent a clubface and a club path image TG1 for the first swing and the combination of a group of line segments FG2 that represent a clubface and a club path image TG2 for the second swing. It is preferable for the combination of the group of line segments FG1 that represent a clubface and the club path image TG1 for the first swing and the combination of the group of line segments FG2 that represent a clubface and the club path image TG2 for the second swing to be projected and displayed in different colors.

Further, the control unit 23 is capable of causing the projection device 30 to display information related to the shaft 41b of the golf club 41 on the floor surface, based on the positional data of the neck and the edge. Specifically, the control unit 23 generates and displays a line segment that represents the shaft 41b based on a line that connects the positions of the neck and the edge. The control unit 23 is capable of sequentially displaying the multiple captured images which are captured in temporal series during the swing of the golf club 41, and can display the line segments that represent the shaft 41b in each of the sequentially displayed captured images. Thereby, the movement of the shaft 41b during the swing of the golf club 41 can be articulated, which will be an aid to analyzing the swing and selecting a golf club.

Still further, the control unit 23 may calculate the center positions of the line segments that represent the clubface in each of the aforementioned multiple captured images, and calculate the speed of the clubhead 41a based on the distances among the center positions among frames and the frame rate. The control unit 23 may cause the projection device 30 to display the calculated speed of the clubhead 41a on the floor surface.

Still yet further, the control unit 23 causes the display unit 24 to display the positional data of the toe, the heel, the neck, and the edge, the group of line segments that represent the clubface of the clubhead 41a and the club path image, and the line segments that represent the shaft 41b.

The display unit 24 is equipped with a display device such as a liquid crystal display. In addition, the input unit 25 is equipped with input devices such as a mouse and a keyboard, for example. Alternatively, the control device 20 may be constituted by a tablet terminal, and the display unit 24 and the input unit 25 may be constituted by a touch panel.

Next, returning to FIG. 1, the projection device 30 is constituted by a projector. As described above, the projection device 30 projects and displays the captured images in which the toe, the heel, the neck, and the edge are denoted by points, the group of line segments that represent the clubface, and the club path image on the floor surface. The projection device 30 is provided adjacent to the image capturing device 10 above the golfer who swings the golf club 41, or below the golfer in the case that a short focal length/close up lens is employed. In addition, the projection device 30 has a projection distance and a brightness capable of displaying the captured images, the group of line segments that represent the clubface, and the club path image on the floor surface with sufficient luminosity and clarity.

The projection device 30 is provided so as to be capable of projecting and displaying the captured images in which the toes, the heels, the necks, and the edges are denoted by points, the group of line segments that represent the clubface, and the club path image to a predetermined projection range on the floor surface having the position P at which the golf ball 42 is placed in the vicinity of the center thereof. The projection device 30 may be provided on a support structure such as a stand with the image capturing device 10, or may be mounted on the ceiling.

Note that in the embodiment described above, images of the clubhead 41a are captured from directly above. However, the present disclosure is not limited to such a configuration. A stereoscopic camera may be provided as the image capturing device 10, and images of the clubhead 41a may be captured stereoscopically whereby the position of image capturing device can be provided in any other locations.

In this case, the specified position detecting unit 22 may detect positional data of the toe, the heel, the neck, and the edge from each of the captured images which are obtained by stereoscopic image capturing, to detect the positions of the toe, the heel, the neck, and the edge in a three dimensional space. Thereby, the movement of the golf club 41 can be analyzed in greater detail. The control unit 23 may generate a three dimensional line segment image by connecting the positions of the toe, the heel, the neck, and the edge in the three dimensional space, and cause the display unit 24 to display the generated line segment image three dimensionally.

Figure 5:
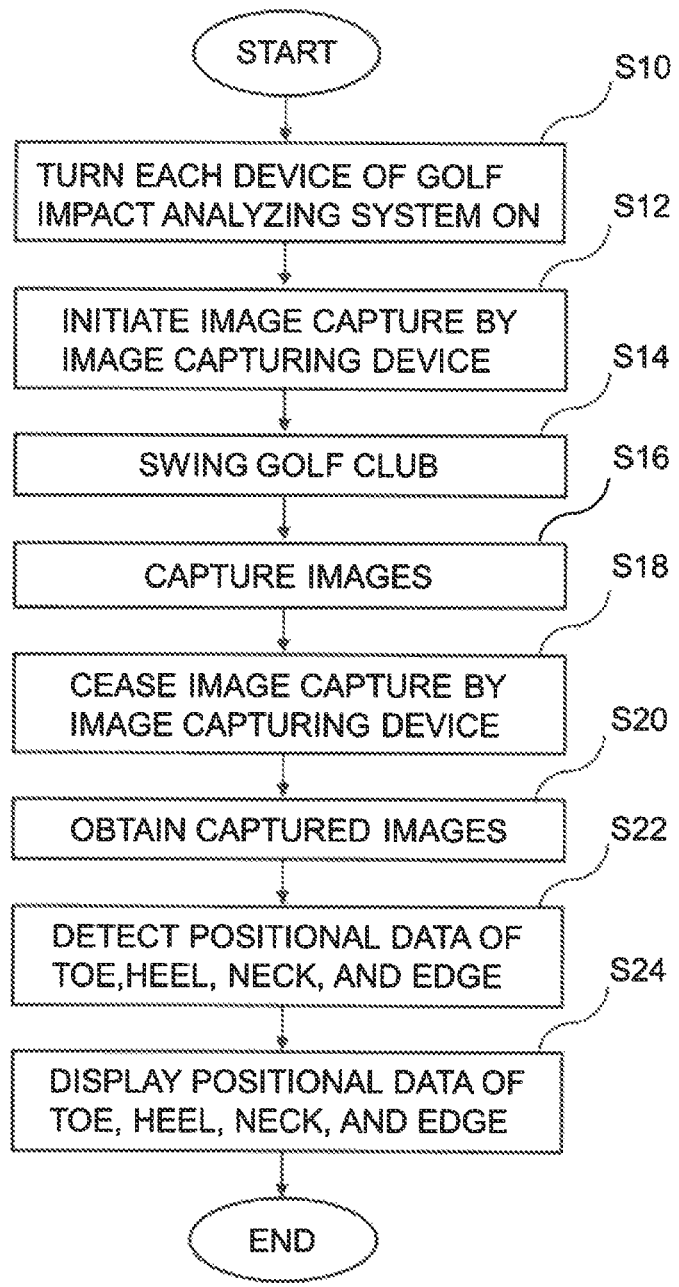
FIG. 5 is a flow chart for explaining the sequence of processes which are performed by the golf impact analyzing system illustrated in FIG. 1.

Next, the sequence of processes which are performed by the golf impact analyzing system 1 will be described with reference to the flow chart illustrated in FIG. 5.

First, each of the devices that constitute the golf impact analyzing system 1 is turned ON (S10). Next, the golfer stands in the vicinity of the image capture range R as illustrated in FIG. 1, and places the golf ball 42 at the position P within the image capture range R.

Then, a user sets and inputs an image capture initiating command at the control device 20, and image capture by the image capturing device 10 is initiated (S12).

After image capture by the image capturing device 10 is initiated, the golfer swings the golf club 41 and hits the golf ball 42 (S14).

While the golfer is swinging the golf club 41, images in the image capture range R are captured by the image capturing device 10 at a predetermined frame rate (S16), and the captured images which are captured in temporal series are sequentially output to the control device 20. The image capturing device 10 ceases image capture at a point in time at which a preset amount of time elapses from initiating image capture (S18).

The captured images output from the image capturing device 10 are input to the control device 20 and obtained by the captured image obtaining unit 21 (S20). The specified position detecting unit 22 inputs each of the captured images which are obtained by the captured image obtaining unit 21 into the learned model described above, and detects positional data of the toe, the heel, the neck, and the edge within each captured image (S22).

Then, the control unit 23 causes the projection device 30 to display the multiple captured images which are captured in temporal series on the floor surface, with points at the positions of the toe, the heel, the neck, and the edge overlapped on each captured image (S24). Thereby, the states of movement of the toe, the heel, the neck, and the edge during the swing can be articulated, and information related to the swing of the golf club can be confirmed more easily.

In addition, four points are displayed at the positions of the toe, the heel, the neck, and the edge in the embodiment described above. However, the present disclosure is not limited to such a configuration. Two points may be displayed at the positions of the toe and the heel, or three points may be displayed at the positions of the toe, the heel, and the neck, for example.

Further, the embodiment described above is an example in which the images of the clubhead 41a are captured from directly above. However, the angle of image capture is not limited, as long as images of at least the toe and the heel, preferably the toe, the heel, and the neck, and more preferably the toe the heel, the neck, and the edge can be captured. For example, machine learning may be executed employing captured images in which images of the clubhead 41a are captured from a diagonally transverse direction such that images which are captured from this direction can be articulated to generate the learned model.

The items below are additionally disclosed regarding the display control apparatus of the present disclosure.

Additional Items

In the display control apparatus of the present disclosure, the learned model may be that which is obtained by further machine learning relationships between multiple captured images and positional data of necks of golf clubs which are included in each of the captured images, the specified position detecting unit may further detect positional data of a neck of a golf club, and the control unit may display information based on the positional data of the neck of the golf club.

In addition, in the display control apparatus of the present disclosure, the learned model may be that which is obtained by further machine-learning the relationships between multiple captured images and positional data of necks of golf clubs and an edge of the multiple captured images where the shafts of golf clubs are positioned. The specified position detecting unit may further detect positional data of a neck of a golf club and an edge of an image where the shaft is positioned, and the control unit may display information based on the positional data of the neck of the golf club and the edge of the image where the shaft is positioned.

Further, in the display control apparatus of the present disclosure, the control unit may generate and display a line segment that represents a clubface of a clubhead, based on positional data of a toe and a heel of the clubhead.

Still further, in the display control apparatus of the present disclosure, the control unit may generate and display a line segment that represents a shaft of a golf club, based on positional data of a neck of the golf club and an edge where the shaft is positioned.

Still yet further, in the display control apparatus of the present disclosure, the control unit may generate and display information regarding a club path of a clubhead, based on positional data of a toe and a heel of the clubhead.

In addition, in the display control apparatus of the present disclosure, the learned model may be that which is obtained by machine learning the relationships between multiple captured images having different levels of luminosity and positional data of toes and heels which are included in the multiple captured images.

What is claimed is:

1. A display control apparatus comprising:
    a captured image obtaining unit that obtains multiple captured images of a clubhead of a golf club during a swing of the golf club in temporal series from above;
    a specified position detecting unit that detects positional data of both of a toe and a heel of the clubhead which are included in the multiple captured images, by inputting the multiple captured images obtained by the captured image obtaining unit into a learned model obtained by machine learning of relationships between multiple arbitrary images of clubheads of golf clubs captured from above and positional data of both of the toe and the heel of the clubhead which are included in each of the multiple captured images; and
    a control unit that displays information based on the positional data of both of the toe and the heel of the clubhead detected by the specified position detecting unit as points within the multiple captured images, and sequentially displays the multiple captured images having the points displayed therein.

2. The display control apparatus as defined in claim 1, wherein:
    the learned model is that which is obtained by further machine learning the relationships between multiple arbitrary captured images and positional data of necks of golf clubs which are included in each of the captured images:
    the specified position detecting unit further detects positional data of a neck of a golf club; and
    the control unit displays information based on the positional data of the neck of the golf club as points within the multiple captured images.

3. The display control apparatus as defined in claim 1, wherein:
    the learned model is that which is obtained by further machine learning the relationships between multiple arbitrary captured images and positional data of necks of golf clubs and an edge of the multiple captured images where the shafts of golf clubs are positioned, the specified position detecting unit may further detect positional data of a neck of a golf club and an edge of an image where the shaft is positioned, and the control unit may display information based on the positional data of the neck of the golf club and the edge of the image where the shaft is positioned as points within the multiple captured images.

4. The display control apparatus as defined in claim 1, wherein:
    the control unit generates and displays a line segment that represents a clubface of a clubhead, based on positional data of both of the toe and the heel of the clubhead.

5. The display control apparatus as defined in claim 3, wherein:
    the control unit generates and displays a line segment that represents a shaft of a golf club, based on positional data of a neck of the golf club and an edge where the shaft is positioned.

6. The display control apparatus as defined in claim 1, wherein:
    the control unit generates and displays information regarding a club path of the clubhead, based on positional data of both of the toe and the heel of the clubhead.

7. The display control apparatus as defined in claim 1, wherein:
    the learned model is that which is obtained by machine learning relationships between multiple captured images having different levels of luminosity and positional data of both of the toe and the heel which are included in the multiple captured images.

8. The display control apparatus as defined in claim 1, wherein the specified position detecting units utilizes the learned model to detect all of the toe, the heel, a neck, and an edge of the clubhead, and
    wherein the control unit that further displays information based on the positional data of the neck and the edge of the clubhead detected by the specified position detecting unit as second points within the multiple captured images, and sequentially displays the multiple captured images having the points and the second points displayed therein.

9. The display control apparatus as defined in claim 1, wherein the learned model is obtained by the multiple captured images having different levels of luminosity.

10. The display control apparatus as defined in claim 1, wherein the control unit generates and displays a line segment that represents a clubface of a clubhead, based on positional data of both of the toe and the heel of the clubhead for each of the sequentially displayed multiple captured images.

11. A display control method comprising:
    obtaining multiple captured images of a clubhead of a golf club during a swing of the golf club in temporal series from above;
    detecting positional data of both of a toe and a heel of the clubhead which are included in the multiple captured images, by inputting the multiple captured images into a learned model obtained by machine learning of relationships between multiple arbitrary images of clubheads of golf clubs captured from above and positional data of both of the toe and the heel of the clubhead which are included in each of the multiple captured images; and displaying information based on the positional data of both of the toe and the heel of the clubhead as points within the multiple of captured images, and sequentially displaying the multiple of captured images having the points displayed therein.

12. A non-transitory computer-readable recording medium having stored therein a display control program causing a computer to execute:

a step of obtaining multiple captured images of a clubhead of a golf club during a swing of the golf club in temporal series from above;

a step of detecting positional data of both of a toe and a heel of the clubhead which are included in the multiple captured images, by inputting the multiple captured images into a learned model obtained by machine learning of relationships between multiple arbitrary images of clubheads of golf clubs captured from above and positional data of both of the toe and the heel of the clubhead which are included in each of the multiple captured images; and a step of displaying information based on the positional data of both of the toe and the heel of the clubhead as points within the multiple captured images, and sequentially displaying the multiple captured images having the points displayed therein.

13. A display control apparatus comprising:

a captured image obtaining unit that obtains a plurality of captured images of a clubhead of a golf club during a swing of the golf club in temporal series from above;

a specified position detecting unit that detects the position of both of a toe and a heel of the clubhead which are included in each of the plurality of captured images; and a control unit that that generates line segments that represent a clubface of the clubhead based on the positions of both of the toe and the heel of the clubhead which are detected by the specified position detecting unit, and sequentially displays the generated line segments.

14. A display control method comprising:

obtaining a plurality of captured images of a clubhead of a golf club during a swing of the golf club in temporal series from above;

detecting the position of both of a toe and a heel of the clubhead which are included in each of the plurality of captured images;

generating line segments that represent a clubface of the clubhead based on the detected positions of both of the toe and the heel of the clubhead; and sequentially displaying the generated line segments.

15. A non-transitory computer-readable recording medium having stored therein a display control program causing a computer to execute the steps of:

obtaining a plurality of captured images of a clubhead of a golf club during a swing of the golf club in temporal series from above;

detecting the position of both of a toe and a heel of the clubhead which are included in each of the plurality of captured images;

generating line segments that represent a clubface of the clubhead based on the detected positions both of the toe and the heel of the clubhead; and sequentially displaying the generated line segments.

16. A display control apparatus comprising:

a captured image obtaining unit that obtains multiple captured images of a clubhead of a golf club during a swing of the golf club in temporal series from above;

a specified position detecting unit that detects positional data of each of a toe and a heel of the clubhead which are included in the multiple captured images, by inputting the multiple captured images obtained by the captured image obtaining unit into a learned model obtained by machine learning of relationships between multiple arbitrary images of clubheads of golf clubs captured from above and positional data of toes and heels of the clubheads which are included in the multiple captured images; and a control unit that displays information based on the positional data of the toe and the heel of the clubhead detected by the specified position detecting unit as points within the multiple captured images, and sequentially displays the multiple captured images having the points displayed therein, wherein a gray scale averaging process is administered onto the multiple captured images by the specified position detecting unit when the multiple captured images are input as targets of detection.

* * * * *